United States Patent [19]
Schneiter et al.

[11] 4,358,998
[45] Nov. 16, 1982

[54] IGNITER FOR A PYROTECHNIC GAS BAG INFLATOR

[75] Inventors: Fred E. Schneiter, Ogden, Utah; David C. Cadwell, Clarkston, Mich.

[73] Assignee: Thiokol Corporation, Newtown, Pa.

[21] Appl. No.: 118,344

[22] Filed: Feb. 4, 1980

[51] Int. Cl.³ ............................ F42B 5/20; F42B 9/18
[52] U.S. Cl. ...................... 102/530; 102/202; 102/202.1; 102/202.13; 280/741
[58] Field of Search .............. 102/39, 276–280, 102/202, 202.1, 202.13, 275.3, 275.7, 530, 531; 280/736, 741

[56] References Cited
U.S. PATENT DOCUMENTS

| 2,618,221 | 11/1952 | Lowe | 102/275.4 |
|---|---|---|---|
| 2,700,336 | 1/1955 | Sillitto et al. | 102/25 |
| 2,955,088 | 8/1961 | Asplund | 102/70 |
| 3,320,884 | 5/1967 | Kowalick et al. | 102/280 X |
| 3,336,869 | 8/1967 | Peterson et al. | 102/278 |
| 3,618,521 | 11/1971 | Montesi | 102/39 |
| 3,663,035 | 5/1972 | Norton | 280/150 AB |
| 3,703,144 | 11/1972 | Colburn, Jr. | 102/278 |
| 3,715,131 | 2/1973 | Hurley et al. | 280/736 |
| 3,810,655 | 5/1974 | Prachar | 102/531 |
| 3,880,447 | 4/1975 | Thorn et al. | 102/39 X |
| 3,972,287 | 8/1976 | Travor et al. | 102/530 |
| 3,972,545 | 8/1976 | Kirchoff | 280/741 |
| 4,005,876 | 2/1977 | Jorgensen | 102/39 X |
| 4,109,578 | 8/1978 | Goetz | 102/39 |

FOREIGN PATENT DOCUMENTS

| 321160 | 3/1975 | Austria . | |
|---|---|---|---|
| 318286 | 12/1902 | France | 102/280 |
| 2144122 | 9/1973 | France . | |
| 2065840 | 1/1981 | United Kingdom . | |

Primary Examiner—Harold J. Tudor
Attorney, Agent, or Firm—Gerald K. White

[57] ABSTRACT

For an inflator for pyrotechnically inflating protective gas bags for vehicles, an igniter is provided which causes the propellant in the inflator to ignite in a progressive manner so as to inflate the bag slowly at the onset but more rapidly later as inflation progresses. The overall inflation time is very rapid but the slow onset of bag deployment starts gentle movement against a vehicle's occupant and thus reduces the possibility of injury as compared with a more sudden movement by rapid inflation from the outset.

8 Claims, 3 Drawing Figures

Н,358,998

IGNITER FOR A PYROTECHNIC GAS BAG INFLATOR

PURPOSE AND BRIEF DESCRIPTION OF THE INVENTION

Inflatable gas bags are now being used in some motor vehicles for the purpose of providing a protective cushioning effect for the occupants of a vehicle in the event of an accident. The bag is located forward of the occupants in a deflated condition but, in the event of a crash, is inflated in a matter of a few milliseconds by a gas produced by the burning of a propellant in an inflator. The inflator propellant is ignited by an igniter which ordinarily starts all of the inflator's propellant burning at once followed by a sudden rush of combustion gases into the bag and a rapid rate of inflation thereof. While such a system performs generally satisfactorily, a problem has arisen in that the rapid rate of inflation right from the outset can result in such a sudden impact of the bag upon the vehicle occupants that small persons or children might possibly be injured slightly. In order to alleviate this problem, the present invention provides a new dual stage igniter which initially ignites only a portion of the total inflator propellant and then subsequently ignites a larger portion of the remaining propellant. In this way, while the total inflation time is only slightly longer than the time required for total ignition, the initial inflation of the bag is more gradual and thus a less sudden and softer action of the bag upon the occupant is experienced with less chance of possible injury to the occupant.

OBJECTS OF THE INVENTION

Accordingly, it is an object of the invention to provide an igniter for the inflating charge or propellant of an inflator for vehicle occupant protective gas bags wherein the igniter causes ignition of only a part of the total propellant initially followed by total ignition thereof.

It is also an object of the present invention to provide an igniter assembly of the foregoing type wherein the assembly includes a plurality of separate igniter segments connected by time delay fuses.

It is also an object of the present invention to provide an igniter of the foregoing type wherein the igniter segments are interconnected in tandem arrangement.

It is also an object of the present invention to provide an igniter of the foregoing type wherein the igniter segments are contained in a housing which has outlets for the gas produced therein.

It is also an object of the present invention to provide an igniter of the foregoing type wherein the gases produced by the various igniter segments are released from the igniter at different locations along the igniter's housing.

Other objects and advantages of the present invention will become apparent from the description and claims which follows.

THE DRAWINGS

DETAILED DESCRIPTION OF THE INVENTION

Figure 1:
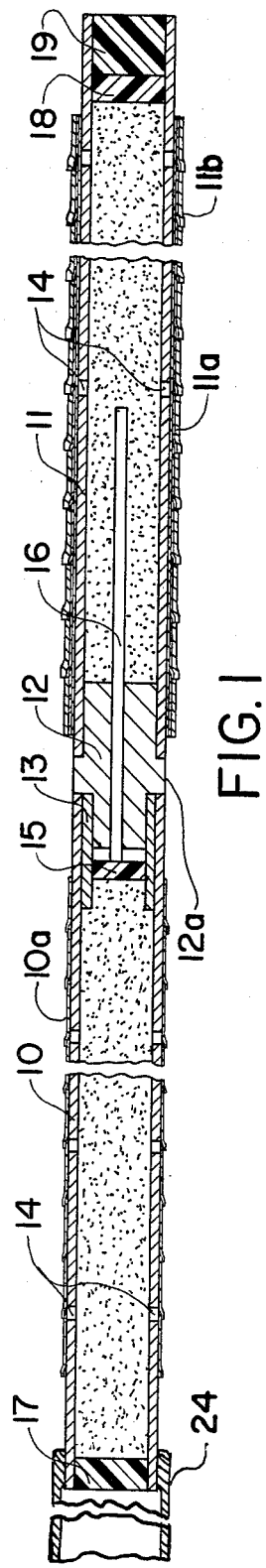
FIG. 1 is a longitudinal cross-sectional view of the igniter showing the tandem arrangement of the separate igniter segments.

In a preferred embodiment of the invention and with particular reference to FIG. 1 of the drawings, the igniter assembly comprises a first housing member or tube 10 and a second housing member or tube 11 which are arranged co-axially in tandem and are interconnected by a steel interconnector 12 which slides into place in the end of each and is retained therein by a coating of epoxy cement. A shoulder or stop 12a is formed on interconnector 12 as shown in FIG. 1 and each tubular member 10, 11 is pushed against it, thus ensuring that a sufficient length of interconnector 12 is inside of each tubular member 10, 11 so that sufficient material will be present to permit an adequately strong epoxied joint to be made. There is provided, however, a steel sleeve 13 between the right hand end of tube 10 in FIG. 1 and interconnector 12, the purpose of which will be explained later in this specification. Both tubes 10, 11 have ports or holes 14 in their walls which pass clear through the walls to afford communication between the interior and exterior of each. These ports, 14, are closed on the exteriors of tubes 10, 11 by a single thickness wrapping of pressure sensitive aluminum tape 10a about tube 10 and a quadruple thickness wrapping 11a about tube 11. Surrounding the multiple aluminum coverings of tube 11 is an additional covering of silicone rubber tape 11b which provides thermal protection for the contained igniter charge to preclude ignition from external heat transfer prior to receipt of the ignition signal acting through the delay means described later in this specification. The tape is wound about each tube with each wrap overlapping the previous wrap slightly and with the total length of wrap sufficient to extend beyond the last port 14 at each end of tubes 10, 11 so that all of the ports 14 are well covered.

As shown in FIG. 1, the aforementioned steel sleeve 13 is fitted to the end of interconnector 12 and extends a short distance into tube 10 where it supports delay plug 15 which is a small disc of solid propellant. The solid propellant may be any composite formulation which has good physical properties and a reproducible burn rate and a typical formulation may contain 60 to 80 percent ammonium perchlorate and up to 16 percent aluminum and polymer binder. The time required to burn through the solid propellant disc 15 is the delay time between the function of the igniter pulses. Disc 15, on its side facing interconnector 12, is in contact with a fuse 16 which extends through a central hole in interconnector 12 into the interior of tube 11 for a distance of about one-third of the length of tube 11.

The fuse 16 is designed to transmit an ignition signal rapidly to the second igniter charge and may be any of a number of commercially available fuse materials. The preferred material is a lead sheathed pyrotechnic material such as that sold as HIVELITE fuse material, a trademark of the McCormick Selph Corporation and having a diameter of about 0.070 inch and a flame propagation rate of about 8400 inches per second.

When the foregoing has been completed, each of tubes 10 and 11 are filled with a high temperature, fast-burning ignition material. A preferred material is a powdered ignition material containing in approximate amounts, 75 percent potassium nitrate, 22 percent boron powder and 3 percent lead azide. Each of the tube ends are then closed with plugs 17, 18, respectively, which are preferably made of polystyrene foam, and an additional plug 19 is used to close and seal off that end of tube 11 which is not attached to interconnector 12 with plug 19 preferably made of a suitable two part, fast setting epoxy compound. The filled tubes 10 and 11 thus comprise, respectively, a first igniter segment and a second igniter segment and these are interconnected by a fuse 16 with the initiation of fuse combustion from the first charge delayed by delay plug 15 as described later in this specification.

Figure 2:
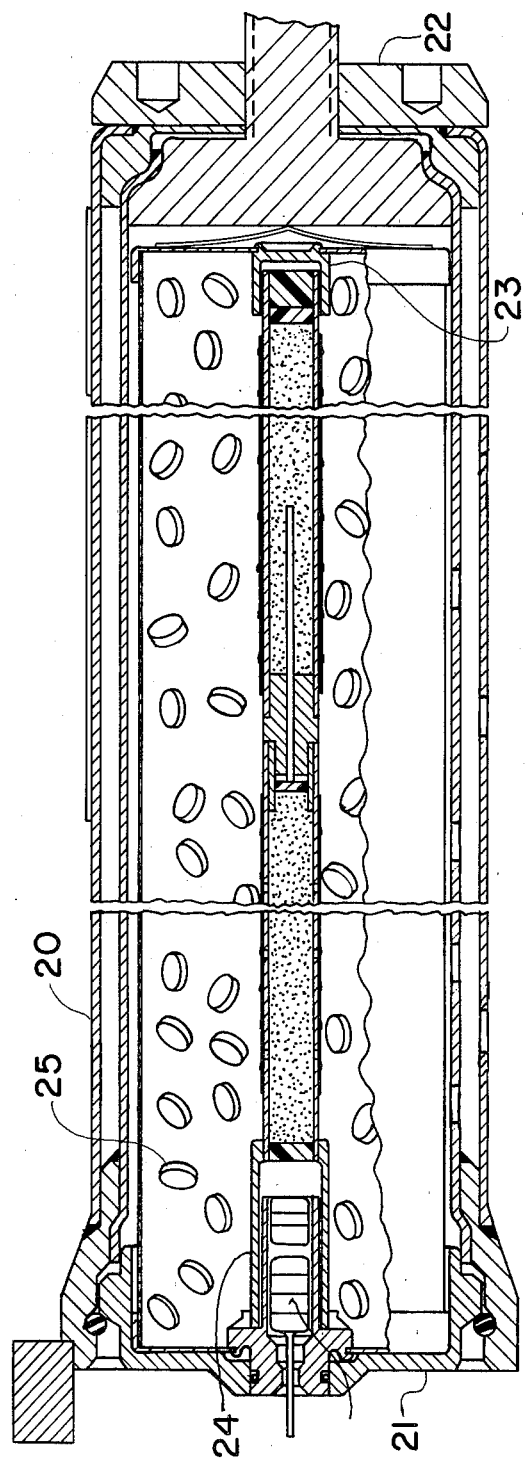
FIG. 2 is a longitudinal cross-sectional view of the igniter installed in a typical protective gas bag inflator.

Although the igniter may have other uses as well, its principal use is in a gas generator which is useful in inflating gas bags for the protection of vehicle occupants in the event of a collision. In FIG. 2 of the drawings, a typical gas generator for inflating such gas bags is shown in which the igniter comprising the present invention is utilized. As will be seen in FIG. 2, the igniter is installed inside of the gas generator 20 with its longitudinal central axis coaxial with the longitudinal central axis of the gas generator and extends substantially the entire length of the generator's interior. The gas generator 20 itself is in the form of a hollow cylinder having a first or head end 21 and a second or outer end 22 which serve to close the ends of the cylinder and also provide a means of support for the igniter at each of its ends. As will be seen in FIG. 2, the igniter's right hand end slips into a support sleeve 23 while the left hand end slips into an adapter 24 in the head 21 which positions the igniter with the initiator 27. The hollow interior of the generator 20 is filled with pellets 25 of gas generating propellant. The gas generating propellant is a coal burning composition which typically contains 60 to 70 percent sodium ozide and may also contain molybdenum disulfide and sulfur. The generator 20 is installed in or on an automotive vehicle's dash and an electrical connection is made to the initiator or squib 27 from a collision detector (not shown) located in an appropriate place in the vehicle.

OPERATION OF THE INVENTION

With the igniter installed in the gas generator 20 and the whole unit installed in a vehicle, the igniter and the system operate in the following manner. An electric signal is sent from the vehicle's collision detector to initiator 27 causing it to burn and produce a hot flame. The heat of this burns through foam plug 17 and ignites the powder in tube 10 (first igniter segment) which burns and generates combustion gases which then pass into ports 14 of tube 10 and exert pressure upon the tape covering them bursting it and allowing the gases to pass through ports 14 into the interior of generator 20 where the high temperature of the gases ignite the propellant pellets 25 in that particular area. While this is occurring, however, the burning powder in tube 10 causes ignition of propellant disc delay 15 which burns and after a short time period, causes ignition of fuse 16 which burns along its length very rapidly. The burning then reaches the powder in tube 11 (second igniter segment) which also becomes ignited. As it did in tube 10, the burning powder in tube 11 produces combustion gases which burst through the tapes 11, 11a and 11b covering ports 14 and these gases are then free to enter the interior of generator 20 in the vicinity of tube 11 where their high temperature ignites pellets 20 in that area with the result that all of the propellant in generator 20 is then burning and producing gases to inflate the crash bag.

Figure 3:
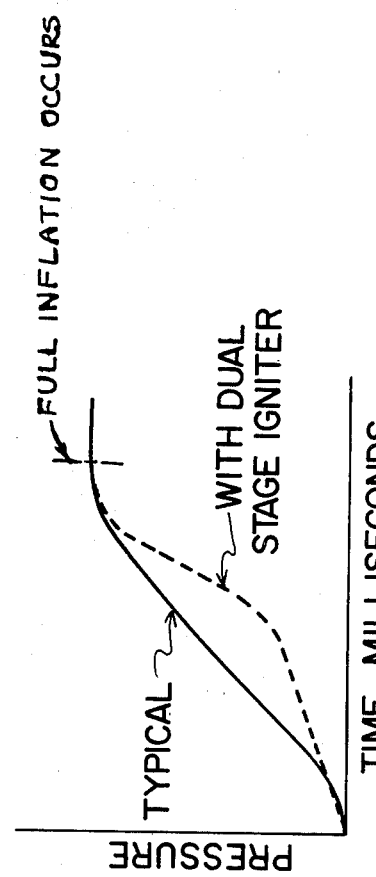
FIG. 3 is a curve chart showing a comparison of the inflation rates of an ordinary igniter and the present invention.

All of this action takes place in a very short time interval but a definite delay of a few milliseconds is experienced in the initial stage of the ignition due to the time it takes to burn through delay disc 15 sufficient to produce an inflation curve of the general sort shown in FIG. 3 where it can be seen that the initial inflation rate is slower than if the entire generator 20 is ignited at once but the overall time required for full inflation remains the same.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore to be limited only as indicated by the scope of the following claims.

We claim:

1. A dual pressure rise igniter for the propellant in a protective gas bag inflator comprising
   a first igniter segment,
   at least one additional igniter segment,
   with igniter powder contained in each of said segments,
   means for igniting said first igniter segment,
   combustible fuse means including a delay propellant disc and a fuse, said delay propellant disc having a first side and a second side, said fuse having a first end and a second end,
   a first tubular igniter powder enclosing housing for said first igniter segment, said delay propellant disc being positioned within said first housing with said first side thereof in contact with the igniter powder in said first housing,
   a second tubular igniter powder enclosing housing for the next adjacent igniter segment,
   said first and second housing each having at least one outlet port through the side wall thereof in communication with the igniter powder therein,
   pressure sensitive cover means for the outlet port in each of said first and second housings, said cover means on said second housing being thicker than that on said first housing,
   an interconnecting member having a hole therein, said fuse extending through said hole in said interconnecting member;
   said first and second housings being interconnected by said interconnecting member in coaxial tandem arrangement with said first end of said fuse contacting said second side of said delay propellant disc in said first housing and with said second end of said fuse contacting the igniter powder in said second housing, and
   additional cover means for the outlet port in said second housing for providing thermal protection from external heat for the igniter powder contained therein thereby to preclude ignition from external heat transfer prior to receipt of an ignition signal acting through said combustible fuse means.

2. The invention set forth in claim 1 wherein said pressure sensitive cover means for the outlet port in said first housing comprises a single thickness wrapping of pressure sensitive aluminum tape and said pressure sensitive cover means for the outlet port in said second housing comprises a quadruple thickness wrapping of pressure sensitive aluminum tape.

3. The invention set forth in claim 2 wherein said additional cover means for said second housing comprises a covering of silicone rubber tape.

4. The invention set forth in claim 3 wherein said first housing includes a first end and a second end and said second housing includes a third end and a fourth end, and further including a steel sleeve positioned in said first end of said first housing for supporting said delay propellant disc and wherein said interconnecting member is made of steel and has first and second cylindrical ends with a common longitudinal axis and including an intermediate shoulder, said hole being in alignment with said longitudinal axis, said first cylindrical end being positioned in said sleeve and said second cylindrical end being positioned in said third end of said second housing.

5. The invention set forth in claim 4 wherein said solid propellant disc contains 60 to 80% of ammonium perchlorate and up to 16 percent aluminum and polymer binder.

6. The invention set forth in claim 5 wherein said fuse comprises a lead sheathed pyrotechnic material having a flame propagation rate of about 8400 inches per second.

7. The invention set forth in claim 4 including first plug means closing said second end of said first housing, said first plug means being combustible, wherein said means for igniting said first igniter segment includes an initiator adjacent said second end of said first housing, and including second plug means for closing and sealing off said fourth end of said second housing.

8. The invention set forth in claim 7 with the igniter located inside an inflator in close proximity to propellant in the inflator and the outlet ports of said first and second housings in proximity to different areas of said propellant.

* * * * *